United States Patent [19]
Litwinowicz et al.

[11] Patent Number: 5,680,531
[45] Date of Patent: Oct. 21, 1997

[54] ANIMATION SYSTEM WHICH EMPLOYS SCATTERED DATA INTERPOLATION AND DISCONTINUITIES FOR LIMITING INTERPOLATION RANGES

[75] Inventors: Peter C. Litwinowicz, Sunnyvale; Lance Williams, Cupertino; Shenchang Eric Chen, Sunnyvale, all of Calif.

[73] Assignee: Apple Computer, Inc., Cupertino, Calif.

[21] Appl. No.: 87,210

[22] Filed: Jul. 2, 1993

[51] Int. Cl.$^6$ ............................................. G06T 13/00
[52] U.S. Cl. ................................................... 395/173
[58] Field of Search ..................... 395/152, 136, 395/141–143, 128–130, 173

[56] References Cited

U.S. PATENT DOCUMENTS

| | | | |
|---|---|---|---|
| 4,797,836 | 1/1989 | Witek et al. | 395/152 |
| 5,175,808 | 12/1992 | Sayre | 395/133 |
| 5,226,115 | 7/1993 | Fiasconaro | 395/141 |
| 5,243,694 | 9/1993 | Fiasconaro | 395/141 |
| 5,299,302 | 3/1994 | Fiasconaro | 395/142 |
| 5,303,386 | 4/1994 | Fiasconaro | 395/141 |

OTHER PUBLICATIONS

Grimson, "An Implementation of a Computational Theory of Visual Surface Interpolation", Computer Vision, Graphics, and Image Processing, v. 22, pp. 39–69. Jan. 1983.
Brandt, "Multi–level Adaptive Solutions to Boundary–Value Problems", Mathematics of Computation, v. 31, n. 138, pp.333–390. Apr.1977.
Wolberg, "Skeleton–based image warping", The Visual Computer, v. 5, n. 1–2, pp. 98–108. Jan. 1989.
Terzopoulos et al., "Elastically Deformable Models", Computer Graphics, v. 21, n. 4, pp. 205–214. Jul. 1987.
Terzopolous et al., "Modeling Inelasic Deformation: Viscoelasticity, Plasticity, Fracture", Computer Graphics, v. 22, n. 4, pp. 269–278. Aug. 1988.
Terzopoulos et al., "Physically Based Models with Rigid and Deformable Components", IEEE Computer Graphics and Applications, v. 8, n. 6, pp. 41–51. Nov. 1988.
Terzopoulos, "Regularization of Inverse Visual Problems Involving Discontinuities", IEEE Transactions on Pattern Analysis and Machine Intelligence, v. PAMI–8, n. 4, pp. 416–424. Jul. 1986.
Terzopoulos, "Multilevel Computational Processes for Visual Surface Reconstruction", Computer Vision, Graphics, and Image Processing, v. 24, pp. 52–96. Jan. 1983.
Foley et al., "Visualization of Irregular Multivariate Data", Proc. of the First IEEE Conf. on Visualization (Visualization '90), pp. 247–254. Oct. 1990.
Voegele, "Scattered Data Interpolation Tools in a Microcomputer Visualization Environment", Proc. of the First IEEE Conf. on Visualization (Visualization '90), pp. 315–322. Oct. 1990.
Petersen et al., "A System for Automated Interpolation and Visualization of Height Grids from Contour Images", J. of Imaging Tech., v. 17, n. 4, pp. 195–200. Aug. 1991.

(List continued on next page.)

*Primary Examiner*—Heather R. Herndon
*Assistant Examiner*—Joseph R. Burwell
*Attorney, Agent, or Firm*—Burns, Doane, Swecker & Mathis

[57] ABSTRACT

An animation system employs scattered data interpolation to provide fluent animation of still images. Discontinuities, such as cuts and holes, can be established within an image, to limit the range over which interpolation is carried out for a given deformation of a feature in the image, and thereby refine the control exerted by animated features. The amount of computational time and effort required to interpolate the change from one frame of an animation to the next is reduced by concentrating computation of the deformed image on areas of change. Computational requirements are further reduced by taking advantage of frame-to-frame coherence.

25 Claims, 4 Drawing Sheets

OTHER PUBLICATIONS

Petersen et al., "A New Morphological Algorithm for Automated Interpolation of Height Grids from Contour Images", SPIE vol. 1256 Stereoscopic Displays and Applications, pp. 62–72. Jan. 1990.

Gerald, C.F., *Applied Numerical Analysis*, Addison–Wesley, 1970, pp. 143–162.

Terzopoulas, D., "The Computation of Visible–Surface Representations", *IEEE Transactions on Pattern Analysis and Machine Intelligence*, vol. 10, No. 4, Jul. 1988, pp. 417–438.

Bookstein, F.L., "Principal Warps: Thin–Plate Splines and the Decomposition of Deformations", *IEEE Transactions on Pattern Analysis and Machine Intelligence*, vol. 11, No. 6, Jun. 1989, pp. 567–585.

Wolberg, G., *Digital Image Warping*, IEEE Computer Society Press, 1990, pp.222–260.

Litwinowicz, P.C., "Inkwell: A 2½–D Animation System", *Computer Graphics*, vol. 25, No. 4, Jul. 1991, pp. 113–122.

Beier, T., et al, "Feature–Based Image Metamorphosis", *Computer Graphics*, vol. 26, No. 2, Jul. 1992, pp. 35–42.

ANIMATION SYSTEM WHICH EMPLOYS SCATTERED DATA INTERPOLATION AND DISCONTINUITIES FOR LIMITING INTERPOLATION RANGES

FIELD OF THE INVENTION

The present invention generally relates to the manipulation of images, and more particularly to the animation of images through computer graphics.

BACKGROUND OF THE INVENTION

In animation, all action is portrayed by drawings, e.g. points, lines and curves, that are defined at arbitrary instances of time. Originally, these instances of time were discretized into frames, and each frame of the animation was drawn by an artist. With the availability of the tools offered by computer graphics, it is no longer necessary for the animator to specify each feature of each frame in the animation. Rather, the animator is free to define desired features at any point in time. These points in time that are selected by the animator are labelled as keyframes, and the computer can automatically interpolate the motion of a specified feature from one keyframe to the next. Similarly, it is no longer necessary for the animator to define the location of each point, line and curve in each keyframe. Rather, the animator can select only specific features of an element, e.g. a knee joint on a stick figure or the corner of a mouth, and identify its desired locations in successive keyframes. The computer interpolates the full picture for each keyframe from these designated features.

One of the earliest techniques for animation using computer graphics employed "feature based" deformation of images. As used in the context of the present invention, the term "deformation" refers to the changes in the features of an image from one keyframe to the next. The early approaches to computerized animation involved the use of an animated skeleton, or similar type of stick figure, which drove the animation of the drawing. For example, a character in a drawing who was to undergo movement would be represented by a stick figure. Each line, or other elemental feature, of the figure had one or more associated polygons which contained the drawing texture that represented the actual body of the figure. For example, the leg of a character could be represented by two lines, one from the hip to the knee, and the other from the knee to the ankle. Each of these two lines would have associated texture polygons, e.g., rectangles, which respectively represented the thigh and calf of the figure. To illustrate animated movement of the character from one keyframe to the next, the animator would redraw the positions of the two lines in the character's leg for the succeeding keyframe. The texture polygons associated with these lines would follow their movement, to provide the animation that appeared as movement of the character's leg.

While this feature-based skeletal approach removed the need for the animator to redraw every feature of a drawing to illustrate movement, it was not totally satisfactory for animation. More particularly, the texture polygons associated with each of the lines of the stick figure created separate artifacts. If the figure was deformed by a significant amount from one keyframe to the next, the viewer could observe straight-line movement of the polygons, which was not smooth and natural in appearance.

In an effort to provide a smoother form of animation, deformations based on tensor-product splines were employed. Generally speaking, in this approach a grid was overlaid on the image to be animated, and key features of the image were correlated with points on the grid, for both the original and deformed image. A tensor-product spline was then employed to interpolate the required amount of deformation of each point on the grid from one keyframe to the next. For further information on this approach, reference is made to Wolberg, "Digital Image Warping", IEEE Computer Society Press, 1990, particularly at pages 222–260.

While the approach based on tensor-product splines provided a much smoother animation, it also had its attendant limitations. More particularly, the resolution of the grid played an important role in the final result that was achieved. If the grid had a coarse resolution, i.e. a relatively few number of points, control over the features of the drawing was very limited, and undesired images could result. Conversely, if a finer grid was employed to provide a greater mount of control, the animator was required to manipulate many more points to obtain the desired result, thereby increasing the amount of effort required.

More recently, an approach has been suggested which does not require the use of tensor-product splines. See Beier and Neely, "Feature-Based Image Metamorphosis," *Computer Graphics*, Volume 26, Number 2, July 1992, pp. 35–42. Although the approach described in this publication is labelled as "feature-based," it does not employ texture polygons as in earlier feature-based techniques described above, and therefore provides a smoother transition from one image to another. This technique is based on scattered data interpolation, and allows the user to place control points at any desired location, rather than being tied to the points of a grid. In addition, the user can specify lines as well as points for control purposes.

In operation, the technique described in the article by Beier et al utilizes a displacement surface that is created by a Shepard's interpolant. For a detailed description of this interpolant, reference is made to Shepard, D., "A Two-Dimensional Interpolation Function for Irregularly Spaced Data," Proceedings of the 23rd Nat. Conf. ACM 1968, pp. 517–523. Unfortunately, there are various limitations associated with this interpolation technique. First, the Shepard's interpolant does not always produce a smooth surface. Rather, it can result in cusps or flat spots at various data points, which produce unwanted distortions in the resulting image. Secondly, the mount of processing power that is required to compute the image increases with the square of the number of data points. Thus, as the user specifies more data points to provide greater control over the image, the amount of processing, and the time to compute the image, increases dramatically. Finally, the displacement surface that is employed is seamless and continuous, with the result that a change in any one portion of the image has an effect upon all other portions of the image. While this result may be desirable for some types of image deformations, such as the metamorphosis described in the Beier et al article, in animation there may be occurrences where the user desires to isolate a deformation in one part of the image from adjacent elements in the image. For example, when a character's lower lip is moved, that movement should not necessarily cause the upper lip to move as well. Such isolation of features is very hard to control in the above-noted approach.

It is desirable, therefore, to provide an animation system which produces a smooth deformation of each feature in an image, without requiring a significant amount of processing power to compute deformations of images during animation. More particularly, it is desirable to provide an animation system which enables the animator to specify any number of control points or lines at random locations on an image, and which deforms the image in accordance with the animator's manipulation of those control points in an efficient manner.

BRIEF STATEMENT OF THE INVENTION

In accordance with the present invention, the foregoing objectives are met by an animation system which employs scattered data interpolation to provide fluent deformation of still images. In a preferred embodiment of the invention, a thin-plate spline is used as the interpolant for the image. Discontinuities are established within the image, to limit the range over which interpolation is carried out for a given deformation of a feature in the image. These discontinuities can be located wherever the animator desires, and can be used to isolate separate features of the image. With this approach, cuts and holes can be placed in the thin plate spline, to enable various features to be deformed independently of one another. As a result, unwanted distortions of the image are avoided.

As a further feature, the present invention reduces the amount of time and computational effort that is required to carry out the animation. Only the features of interest are specified, and calculation of the image deformation is concentrated on the areas where it produces the most benefit. Thus, work is carrier out largely where the animator is changing features, rather than on the image as a whole. This approach takes advantage of frame-to-frame coherence, thereby reducing computational requirements.

Further features of the present invention, and the advantages offered thereby, are explained hereinafter with reference to specific examples illustrated in the accompanying drawings.

DETAILED DESCRIPTION

To facilitate an understanding of its underlying concepts, the present invention is explained with reference to specific animation examples. It will be appreciated, however, that the principles of the present invention are not limited to these particular examples. Rather, they are applicable to any situation in which it is desirable to provide fluent manipulation of an image, whether that image be an original picture or one that has been created by an animator.

As noted previously, the animation system of the present invention is based upon the application of scattered data interpolation techniques to the deformation of images. As will become apparent from the following description, a significant aspect of the use of this technique is that it allows the designer to concentrate on significant features of a desired output. The resulting images are defined by the desired conditions or behavior for these features.

Figure 1:
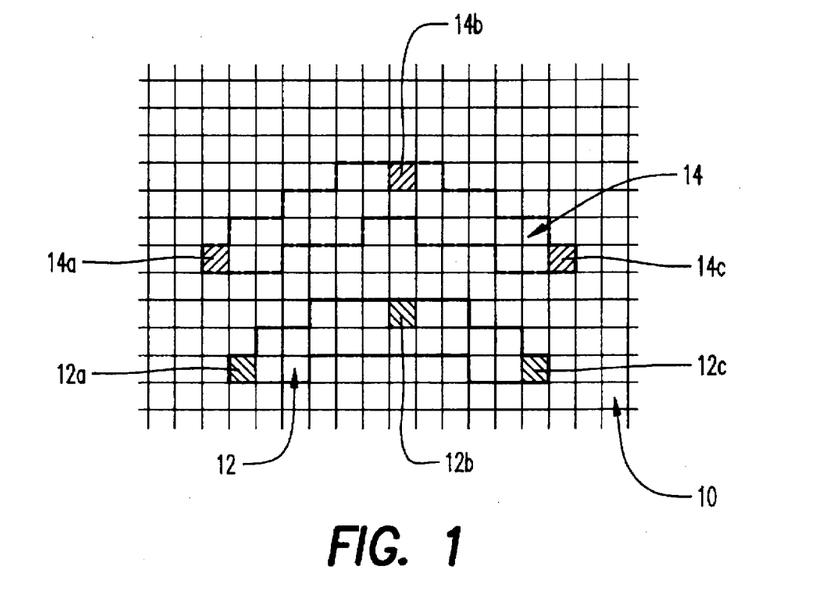
FIG. 1 is an illustration of a grid of pixels forming a part of a display, with an image being displayed on some of the pixels.

An explanation of the manner in which interpolation techniques are applied to images, to achieve animation, will first be described in a general manner with reference to a simple two-dimensional example illustrated in FIG. 1. This figure shows a grid 10 of pixels forming part of a video display for a computer system (not shown). An image 12 is displayed within this grid. The image could represent a feature of a character, for example a black eyebrow.

In the animation, the character's eyebrow is to be raised and arched, to show surprise, for example. In other words, the eyebrow is to move from the solid line position 12 in one frame to the dashed line position 14 in a later frame of the animation. To achieve this movement, the animator first identifies control features on the original image. In FIG. 1, these control features are the points labeled 12a, 12b and 12c. These points correspond to the shaded pixels at the two ends and the top center of the image. The animator can use a stylus, a mouse, or any similar such input device for the computer system to position a cursor and identify the points on the displayed image which will serve as control features. In addition to individual points, lines, curves and solid regions can also be used as the control features.

Once the control features have been identified, the animator determines the position that they will occupy in a subsequent frame of the animation. This subsequent frame need not be the next succeeding frame of the animation. Rather, it can be any frame at an arbitrary time during the animation. After the desired frame has been selected, the animator moves one or more of the control features to the location they will assume in that later frame. This movement can be accomplished by clicking on a feature and dragging it with a mouse, or by other equivalent techniques for directing movement of elements in a display. In the example of FIG. 1, the points 12a, 12b and 12c are moved to the respective positions 14a, 14b and 14c. The displayed texture under each of these control points in the original image, e.g. the color black, is effectively pulled to new positions in the later image.

The image of the eyebrow, of course, consists of many more pixels than the three which have been moved by the animator. It is the function of the interpolation process to determine the new position of each pixel in the original image that lies between or near the three pixels whose position is known. In essence, if the pixels are viewed in terms of x and y coordinates, the displacements of the control features are used to determine the x-axis and y-axis movement of each of the other pixels in the original image.

It is often the case that there is not a direct one-to-one mapping of pixels in the original image to those in the deformed image. In the example of FIG. 1, the control points 12a and 12% in addition to moving up, are also moved slightly outward, away from the center point 12b. As a result, there are more pixels between the center point 14b and each of the end points 14a and 14c in the deformed image 14 than there are in the original image 12. Consequently, there will be holes, i.e. blank pixels, in the deformed image 14 after the interpolation step. To eliminate these holes, the original image undergoes a rendering process to create the deformed image. For example, each pixel in the original image can be mapped to a position in the deformed image, and could possibly fall in between pixels in the displayed image. To avoid empty spaces, four adjacent pixels in the source image can be mapped to the new image space and "rendered" as a textured polygon in the displayed image. Alternatively, known methods for rendering higher-order surfaces other than polygons, e.g. tensor-product splines defined over mesh elements, can be employed. The details of the rendering process do not form a part of the present invention, and therefore are not discussed further herein.

By using this procedure on a frame-by-frame basis, an animated sequence of images can be created by moving a relatively sparse number of control features. If greater control over the movement of features is desired, the animator can specify additional control points at any time during the animation, which serve as handles for further modification.

Figure 2A:
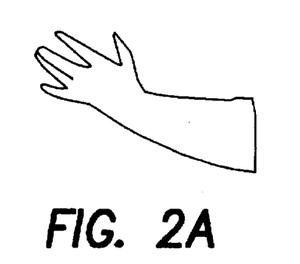
FIGS. 2A–2E are examples of a hand that is being animated, at various stages of the animation.
Figure 2B:
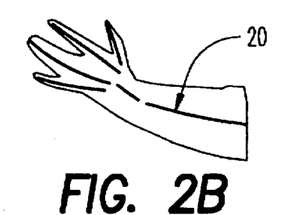

A more elaborate example of an animation will now be explained with reference to FIGS. 2A–2E. FIG. 2A is an image of an extended hand that is to be moved in the animation. In the first step of the animation process, shown in FIG. 2B, the animator superimposes a skeleton 20 on the hand. This can be carried out, for example, by a procedure known as rotoscoping. More particularly, the image can consist of several layers. One layer comprises the original image as shown in FIG. 2A. The skeleton 20 can be drawn on a second layer. The elements in each of these layers are related to one another and move together, although each layer can be separately displayed.

Figure 2C:
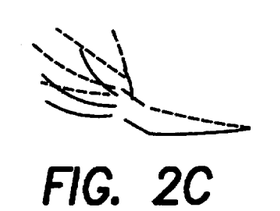

Once the skeleton has been drawn, the layer containing the original image (FIG. 2A) is removed, to display only the skeleton. The animator then draws a new position for the skeleton in a subsequent frame. The original position of the skeleton is represented in FIG. 2C by the dashed lines. Also shown in FIG. 2C is the new (or deformed) position for the skeleton, as represented by the solid lines. Essentially, the hand has moved down and the wrist has turned upward. In addition, the index finger has become more widely spaced from the second and third fingers.

During the animation, the skeleton moves from the position shown in dotted lines to the solid-line position in a fluid manner over the time period encompassed by the two keyframes to which the respective images relate. An example of a system for defining the skeleton and providing the fluid animation motion is described in Litwinowicz, P., "Inkwell: A 2½-D Animation System," *Computer Graphics*, Volume 25, No. 4, 1991, pp. 113–121, the disclosure of which is incorporated herein by reference.

Figure 2D:
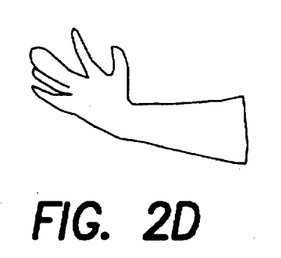
Figure 2E:
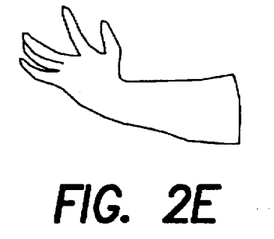

FIGS. 2D and 2E illustrate the results after the deformation of the skeleton has been interpolated over the entire area of the image. FIG. 2D represents the results when the interpolation is carried out according to a conventional image warping technique, and FIG. 2E represents the image resulting from the application of the present invention. In the conventional approach, the surface over which interpolation is carried out is seamless and continuous. As a result, a displacement at one point affects all other points in the image. In the deformation represented by FIG. 2C, the index finger is moved away from the middle finger. As a result, when the space between these two fingers is interpolated according to prior methods, the middle finger has a "fattened" appearance in the resulting image, as evident from FIG. 2D. More particularly, as the index finger is moved away from the middle finger, the interpolation process causes some of the texture for the middle finger to move in that direction. This results in the fattened appearance of the middle finger.

According to one of the features of the present invention, discontinuities or holes are defined in the image to limit the range over which interpolation takes place. In the example of FIGS. 2A–2E, by placing a discontinuity between the index and middle fingers, the interpolation of the movement of the index finger can be limited so that it does not affect the appearance of the middle finger. The result of placing such a discontinuity between these two fingers, in accordance with the present invention, is illustrated in FIG. 2E. As can be seen therefrom, the interpolated view of the middle finger has a more natural appearance.

The discontinuities and holes are determined by the animator, and can be defined in another layer of the drawing. In the example of FIG. 2A, the hand and arm can be filled in with the color white in this layer, and the remainder of the display, including the space between the fingers, can be black. The interface between black and white areas defines a discontinuity for the area over which interpolation takes place. Thus, when the control feature for the index finger, e.g. the skeletal line, is moved away from the middle finger, the white pixels adjacent this line would be interpolated to determine their displacement in the deformed image. However, the interpolation process does not extend across the interface of the white and black pixels. Accordingly, it does not affect the pixels for the middle finger. Rather, the positions of the pixels for this finger are determined by the location of the skeletal control line associated with that finger.

The interpolation discontinuities can be used to identify features of the animated subject whose movements are independent of one another. A good example is the face of an animated character. When a character raises his eyebrows, the positions of his eyes should not change, although the upper eyelid might be lifted a little. Accordingly, it is desirable to draw a discontinuity between the eyes and the remainder of the character's face, so that movement of the eyebrows or the mouth does not result in a shifting of the positions of the eyes. Similarly, a discontinuity can be defined for the mouth, so that downward movement of the lower lip to open the mouth does not pull the upper lip down as well.

Figure 3A:
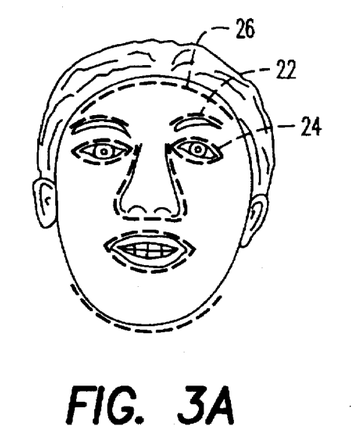
FIGS. 3A and 3B are illustrations of a face, showing the possible locations for control features and interpolation discontinuities.

The control features that are used to define movements during the animation are distinct from the discontinuities. Generally speaking, a control feature is used to determine the placement of a displayed feature at a specific instance during the animation. In contrast, the discontinuities determine the range over which the interpolation of a movement will be carried out. Sample control features for a character's face are indicated by dashed lines in FIG. 3A. Each of these lines delineates a feature which can be grabbed by the animator and moved to any desired location. Features which are not moved will remain in place. In the example of FIG. 3A, to lift the left eyebrow of the character, the animator specifies a new position for a control line 22 above that eyebrow. As a result of this action, the texture above and below the control line 22, including the eyebrow, is moved in the direction of movement of the line 22 through the interpolation process. However, the control features 24 and 26 remain in place.

Figure 3B:
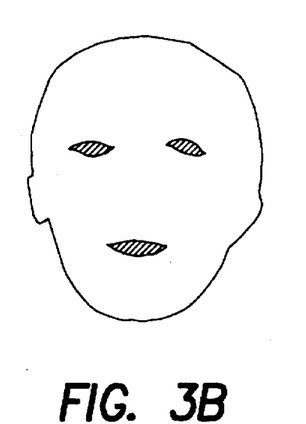

A matte (occasionally termed an "alpha channel" in computer graphics), for controlling the opacity with which a character's face is to be rendered, is depicted in FIG. 3B. As shown therein by the shaded areas, transparent regions are defined over each of the eyes and mouth. In essence, black regions (where opacity is set to zero) constitute transparent areas of the image in which texture from another layer can be displayed. In the current case, that texture comprises the images of the eyes and the interior of the mouth. Shades of gray between black and white can be used to indicate varying degrees of translucency. The opacity is mapped to the surface in the same way as the other components (red, green, and blue in a typical embodiment) of surface texture.

An image like FIG. 3B can similarly be used to define discontinuities (cuts and holes) for the area of interpolation over the displayed image. Rather than modulating the opacity of a layer, such an image controls the propagation of deformations across the displayed layer. A deformation may exert a small influence around a cut or hole, but no influence directly across it. In this manner, for example, the upper eyelids can be moved up and down without imparting similar motion to the lower eyelids. In the example of the face in FIG. 3, the discontinuity map is the same image as the matte for the face (FIG. 3B). These two images are independent, however, so in other circumstances one could have discontinuities in the image interpolation without any variation in its opacity, or translucent or transparent regions in a seamless and continuous surface. In the latter case, control features within transparent regions would still exert undiminished influence on the surrounding portions of the image.

Figure 4A:
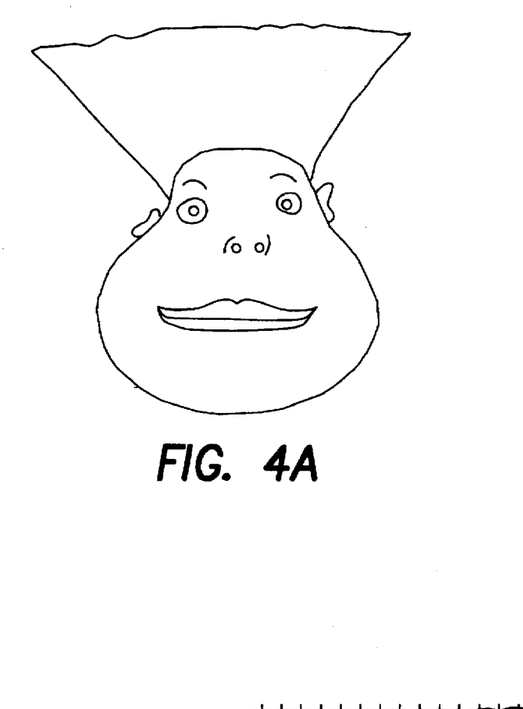
FIGS. 4A–4C are a sequence of illustrations for another example of an animation.
Figure 4B:
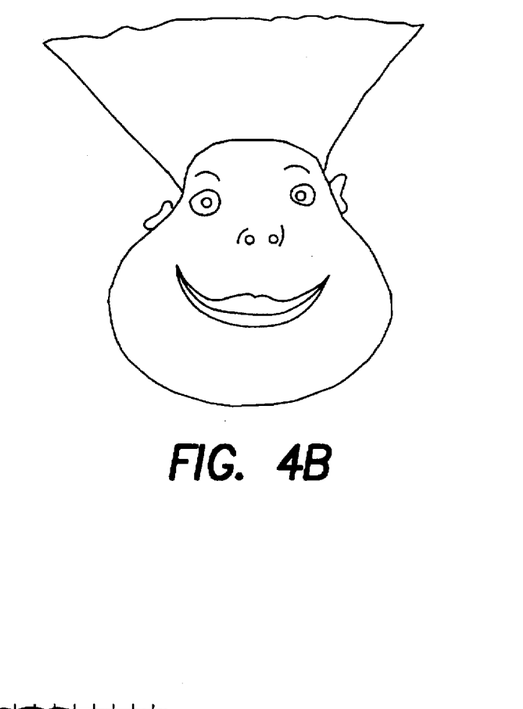

The manner in which interpolation of the deformation is carried out, in accordance with the present invention, is explained in greater detail with reference to FIGS. 4A–4C. In this example, a character's face is to be deformed so that a neutral expression is turned into a smile. The neutral expression of the character's face is illustrated in FIG. 4A, and the smile is shown in FIG. 4B. To deform the neutral expression to a smile, the corners of the mouth are to be upturned.

Figure 4C:
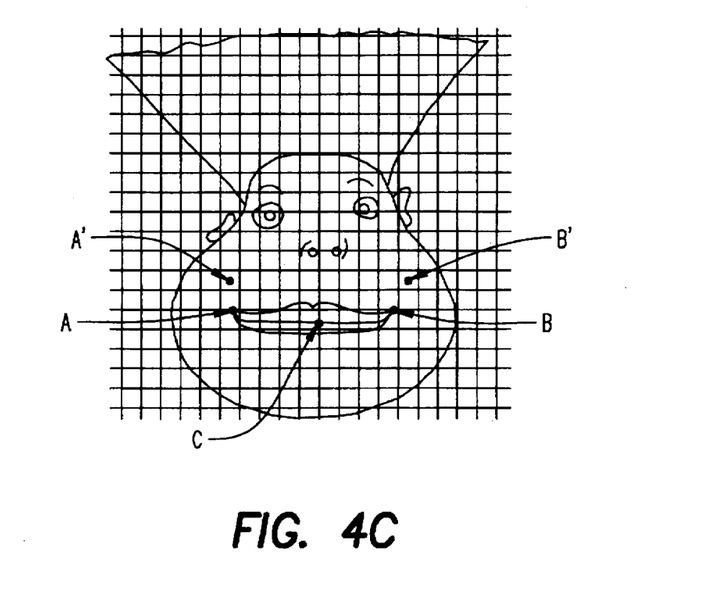

Referring to FIG. 4C, a grid with uniform spacing is overlaid on the image. The animator determines the location of a number of control points on the image that are randomly spaced over the two-dimensional area of the grid. These control points are used by the animator to indicate the movement of a feature during the animation. For the sake of simplicity, only three control points A, B and C are illustrated in the example of FIG. 4C.

To turn the neutral expression into a smile, the animator specifies that the control points A and B are to be moved to new locations, labeled A' and B' in FIG. 4C. The control point C will remain in its original position. In essence, the display parameter values for the pixels at the locations corresponding to the control points A and B are to be respectively moved to the new locations corresponding to the points A' and B'.

Each control point has an associated displacement value determined by its movement in the x and y directions. Each displacement value is assigned to the grid location that is closest to its coordinates. If two or more control points quantize to the same grid location, their corresponding displacement values are averaged. The displacement value at a grid location i, j is denoted as the parameter $a_{ij}$. The control points determined by the animator give i, j and $a_{ij}$ for a set of data. For the example of FIGS. 4A–4C, this data comprises the three sets of coordinates i,j corresponding to the locations of the control points A, B and C, as well as the displacement values for those coordinate locations. The interpolation process computes the displacement values $a_{ij}$ for all of the grid locations i,j that are not in the data set.

Since the control points are arbitrarily spaced over the grid, rather than being confined to specific grid coordinates, a scattered data interpolation process is employed. This scattered data interpolation process is used to define the new coordinates of all points on the grid which are not directly specified by the animator. Preferably, the thin-plate spline is used as an interpolant. Discrete, finite, iterative interpolation techniques that are based upon randomly placed constraints, including the thin plate spline, are described in the prior art.

See, for example, Terzopoulos, D., "The Computation of Visible-Surface Representations," IEEE Transactions on Pattern Analysis and Machine Intelligence, Vol. 10, No. 4, July 1988, pages 417–438, and Bookstein, F., "Principle Warps, Thin-Plate Splines and the Decomposition of Deformations," IEEE Transactions of Pattern Analysis and Machine Intelligence, Vol. 11, No. 6, June 1989, pages 567–585, the disclosures of which are incorporated herein by reference. Although the mathematical details of these interpolation processes do not form part of the present invention, a brief overview of the interpolation process is described to facilitate an understanding of the invention.

Figure 5:
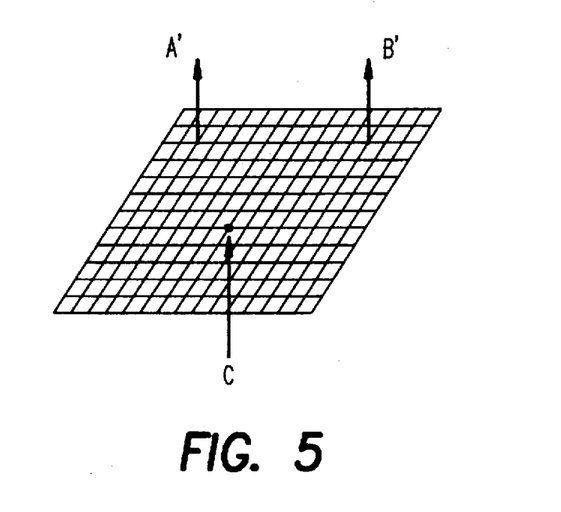
FIG. 5 is a perspective view of an interpolation grid, showing height values for three control points.

From a conceptual standpoint, each of the known displacement values can be interpreted as a height at the corresponding location on the grid. FIG. 5 represents the known heights of the control points A, B and C after the animator has designated the deformation that is to take place. Essentially, the height value at each of the locations A and B is representative of the displacement in one dimension of the control point from its original position. Since the control point C was not changed, its height value is 0, i.e., it remains on the plane of the grid.

The interpolation process effectively functions to determine a smooth surface that passes through all of the known values in the data set determined by the animator. In other words, the interpolation process determines the height of the surface for each grid coordinate that is not in the given set of control points. This surface is referred to as the displacement surface. A displacement surface is determined for each coordinate to be interpolated; for a two-dimensional image, two surfaces are computed, one for x-axis displacement and one for y-axis displacement. Essentially, the height of the surface at each grid coordinate determines the amount by which the x or y position for a given pixel must be displaced to produce the deformed image.

Preferably, the calculation of the displacement surface is solved using a finite difference method, as described in the article by Terzopoulos identified above, such as the thin-plate spline. Generally speaking, a thin plate spline is the surface that minimizes the following energy functional:

$$\int_\Omega \int \frac{\delta^2 F}{\delta u^2} + 2\frac{\delta^2 F}{\delta u \delta v} + \frac{\delta^2 F}{\delta v^2} \, du\, dv \quad (1)$$

where $\Omega$ is the domain of the surface, F is the surface itself, and u and v are two orthogonal directions on the grid. The first step in developing a discrete solution to the surface is to evaluate the first derivative of the thin-plate energy functional with respect to the surface at a point. This derivative can be obtained, for example, by filtering each point with a two-dimensional filter kernel, such as the following:

$$\begin{bmatrix} 0 & 0 & -\frac{1}{20} & 0 & 0 \\ 0 & -\frac{2}{20} & \frac{8}{20} & -\frac{2}{20} & 0 \\ -\frac{1}{20} & \frac{8}{20} & 0 & \frac{8}{20} & -\frac{1}{20} \\ 0 & -\frac{2}{20} & \frac{8}{20} & -\frac{2}{20} & 0 \\ 0 & 0 & -\frac{1}{20} & 0 & 0 \end{bmatrix} \quad (2)$$

The filter kernel is applied at all grid locations where none of the kernel elements cross a boundary of the grid. As noted previously, the animator defines the boundaries of a grid by specifying discontinuities in the image. At grid locations within a kernel's width of a boundary, the surface is evaluated by kernels derived from restricted difference operations on the grid. Reference is made to the above-identified Terzopoulos article for appropriate expressions for these particular cases.

For a thin-plate spline surface, the filter kernels should evaluate to 0 at every location. The difference from 0 at a point is termed its residual, and can be added to that point to relax it towards the surface. This relaxation process is carried out iteratively. It can be done non-recursively, in which case new surface values are computed from prior values and stored in a separate array. This process is equivalent to a Jacobi iteration. Alternatively, the relaxation process can be performed recursively, in which the values in the surface are replaced as they are computed. This recursive approach is equivalent to a Gauss-Seidel iteration. For further information regarding these iterative processes, see Gerald, C., *Applied Numerical Analysis*, Addison-Wesley, 1970, particularly at pages 143–162, the disclosure of which is incorporated herein by reference.

After relaxing the residual at i,j to 0, values for neighboring residuals can be updated incrementally. For example, the residual for location i+1,j can have the following formula:

$$r_{i+1,j} = -a_{i+1,j} + \frac{8}{20} A_1 - \frac{2}{20} A_2 - \frac{1}{20} A_3 \tag{3}$$

where $$A_1 = (a_{i,j} + a_{i+2,j} + a_{i+1,j-1} + a_{i+1,j+1})$$

$$A_2 = (a_{i-1,j} + a_{i+2,j-1} + a_{i,j+1} + a_{i+2,j+1})$$

$$A_3 = (a_{i-2,j} + a_{i+2,j} + a_{i,j-2} + a_{i,j+2})$$

If $r_{ij}$ is added to $a_{ij}$, to thereby relax $r_{ij}$ to zero, then according to equation (1), $r_{i+1,j}$ can be updated by adding $8/20\, r_{ij}$ to $r_{i+1,j}$. As is apparent from the filter kernel above, changing $a_{ij}$ affects at most 12 other grid locations. If $a_{i+1,j}$ is adjacent to a boundary, the coefficient of $r_{ij}$ for updating $r_{i+1,j}$ is modified to reflect the equation for the i+1,j grid location. The proper coefficient is chosen based on the connectivity of the i+1,j grid location to its neighboring grid locations. These coefficients can be predetermined and stored for later use during the relaxation steps.

This procedure is repeated in an iterative fashion, until the values of the residuals are below a desired threshold. For each iteration, it is possible to scan the grid points in order, and carry out the relaxation operation at each grid coordinate. However, it can be appreciated that this approach requires a significant amount of processing power. In addition, work will be carried out in areas where it makes little difference. It is preferable, therefore, to identify the primary sources of the deformation, and spread their influence through the grid efficiently. If residual values are near zero, relaxation is not necessary. Accordingly, a preferred approach is to select the residuals with the largest magnitude, and carry out a relaxation step at the locations of those residuals.

It is possible to further increase the efficiency of the interpolation process by avoiding the need to scan the grid, to search for the largest residual, after each relaxation step. As described previously, once a residual is relaxed to zero, the values for its 12 neighboring residuals can be incrementally updated. In accordance with the present invention, when each of the twelve neighboring residuals is updated, the one having the greatest magnitude, after updating, is noted. Since each neighboring residual must be processed as part of the incremental updating, the additional processing power that is required to locate the residual having the greatest magnitude is negligible. On the next iteration, the relaxation takes place at the neighboring residual having the greatest magnitude.

The advantage of this procedure is that the computational effort is initially carried out in the area of the disturbance, and then gradually spread out over a region that is farther away from the displaced control point. This is to be contrasted with prior interpolation techniques, where the relaxation might occur over the entire area of the image for each iteration of the process.

As noted previously, the area of an image can be separated into different regions by defining discontinuities. With the approach described above, where only connecting neighbors are interrogated to determine the site for the next relaxation step, the displacement surface will only be computed in one region. Accordingly, from time to time it will be necessary to conduct a search of the full grid, to locate the maximum residual magnitude. Otherwise, the relaxation process could be confined to an isolated area. An interpolation process which employs this approach is depicted in the flow chart of FIG. 6, and can be implemented by the computer system.

Figure 6:
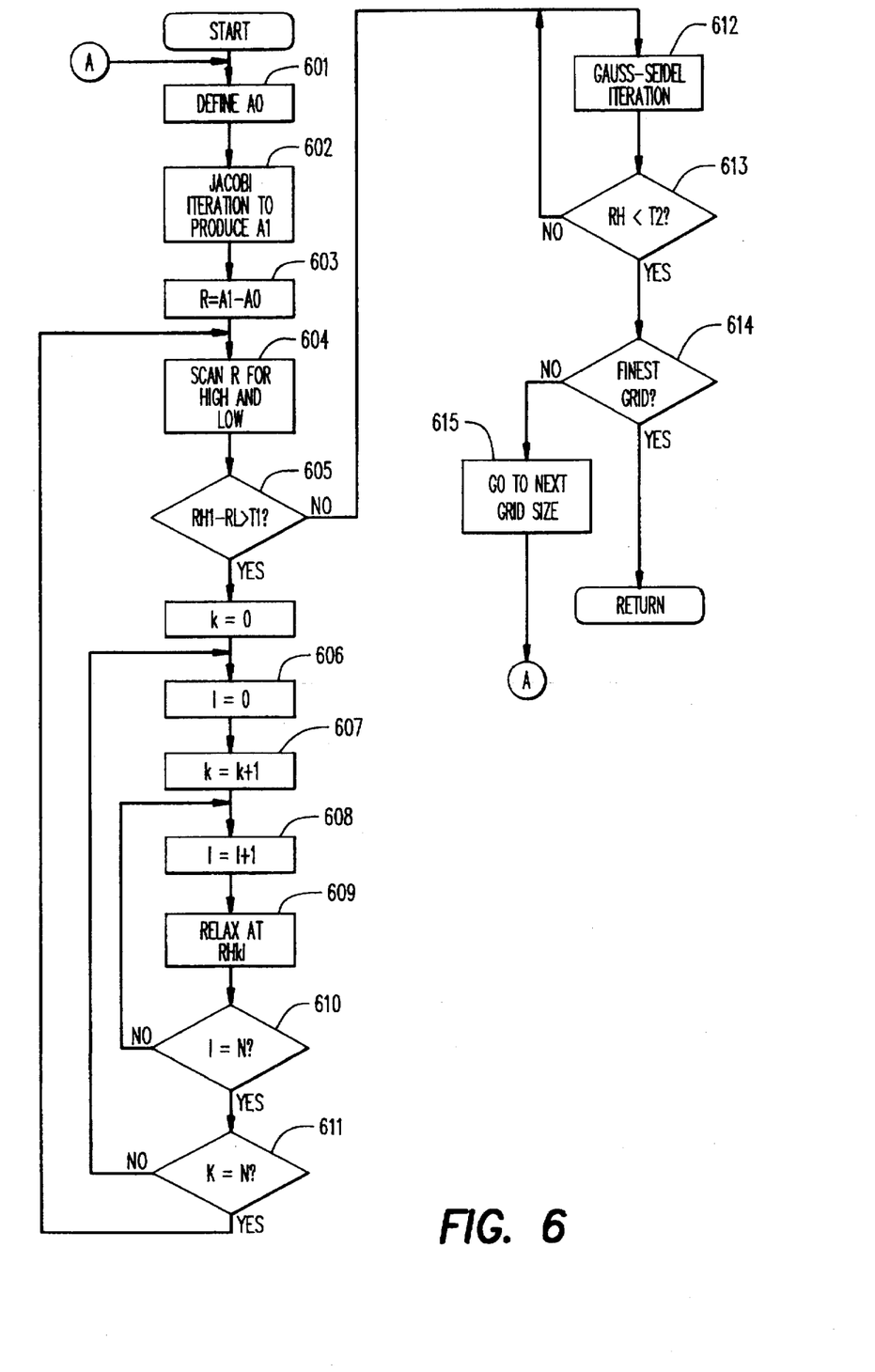
FIG. 6 is a flow chart of the procedure for deforming an image from one keyframe of an animation to the next.

Referring thereto, a surface grid A is defined with dimensions N×N. For convenience, the value of the grid dimension N can be a power of two plus one. The known values $a_{ij}$ are placed in the grid, and all unknown values are set to zero. This initial, or zeroth iteration, grid is denoted as $A^0$ (Step 601). A Jacobi iteration is then carried out, to produce the first approximation to the surface. This operation is performed nonrecursively, and the new surface values are stored in a separate array $A^1$ (Step 602). At Step 603, an initial residual grid R is calculated according to the following formula:

$$R = A^1 - A^0. \tag{4}$$

The residual grid R is then scanned for the N highest residual magnitudes $R_{H1} \ldots R_{HN}$ and the lowest residual magnitude $R_L$ (Step 604). The difference between the highest residual magnitude $R_{H1}$ and the lowest residual magnitude $R_L$ is determined, and compared to a first threshold $T_1$ (Step 605). If the difference is greater than the threshold value, N relaxation steps are carried out, starting with the grid location having the largest residual. More particularly, the residuals to be relaxed are labelled as $R_{Hk1}$. The residual with the largest magnitude, as determined by the scan at Step 604, is labelled $R_{H11}$, the residual with the second largest magnitude is labelled $R_{H21}$, and so on, up to residual $R_{HN1}$. At Steps 606–609, the residual with the largest magnitude, i.e. $R_{H11}$, is relaxed by adding its residual value $r_{ij}$ to its grid value $a_{ij}$. The twelve neighboring residuals around $R_{H11}$ are also updated, as described previously, and the one having the greatest magnitude after updating is then labelled as $R_{H12}$. This residual is then updated, along with its twelve neighbors, and the residual having the greatest magnitude after updating becomes $R_{H13}$. This process continues until N relaxation steps have been carried out in the vicinity of the residual with the largest magnitude (Steps 608–610). At this point, the value of k is incremented (Step 607), and N relaxation steps are carried out, beginning with the residual having the second highest magnitude, $R_{H21}$.

This procedure continues until the largest N residuals have been relaxed, at which point $N^2$ relaxation steps will have been performed (Steps 606–611). When this occurs, i.e. the response to decision step 611 is affirmative, the process returns to Step 604, where the grid is again scanned for the N highest and single lowest residual magnitudes.

These iterations continue, until such time as the difference between the highest and lowest residual magnitudes is less than the threshold value $T_1$. When the decision at Step 605 is negative, the grid is relaxed in order, e.g. the relaxation process begins at the grid point whose i, j coordinates are 1,1, and proceeds in order from point to point. As a new $a_{ij}$ value for each point on the grid is computed, it replaces the old value, i.e. a Gauss-Seidel iteration is carried out (Step 612). After the grid has been relaxed in this manner, the largest magnitude $R_H$ of the residuals is determined, and compared against a second threshold value $T_2$ (Step 613). If the largest magnitude is not less than the threshold, additional recursive relaxation steps are carried out, until the largest residual is below the desired threshold. At this point, the desired surface has been determined.

It is possible to determine the desired surface using a single grid having an arbitrarily determined scale. If the scale is too fine, an excessive number of iterations may be required before the surface is finally determined. Conversely, if the scale of the grid is too coarse, the resulting image may not have the desired smoothness.

Therefore, it is preferable to use a multi-grid approach which offers substantial computational savings. In this approach, the initial computation of the surface is carried out with the use of a relatively coarse grid. Filtering at the coarse level allows the effects of deformations to be distributed rapidly across large regions where control points may be sparse. Once the surface has been determined using a course grid, successively freer grids are employed to compute the values for locations between the points of the coarse grid (Steps 614–615), until the desired resolution is achieved. As an illustrative example, the coarsest grid could have a resolution of 513×513 pixels, and each successively finer grid could have twice the resolution, with the finest grid having a resolution of 5×5 pixels. For each grid, the process depicted in Steps 601–613 of the flow chart in FIG. 6 is employed.

Although a one-way progression from a course grid to a fine grid has been described, in some cases it may be preferable to go from a free grid back to a courser grid before finally ending up at the finest grid. For further information regarding such approaches, reference is made to Briggs, W. L., *A Multigrid Tutorial*, Lancaster Press, 1988.

The foregoing approach directly addresses incremental changes in the values for known data, so that processing is first carried out in areas around the changes, where it has the greatest effect. In areas that are not changed, unnecessary work is not carried out. This approach takes advantage of frame-to-frame coherence in animation. By performing relaxation in the areas of change first, substantial computational savings are realized. In particular, the required computational effort is not a function of the number of points to be computed. Rather, it is related to the amount of deformation that the interpolated surface must undergo in response to displacement of control points, and the number of points on the finest grid. As a result, the animator is free to use as many points as is desired to provide adequate control over the image deformation.

Further, because the number of control points is not a constraining factor, the animator is not limited to the use of points as the control features. In particular, curves and lines can also be employed as control features. The curves and lines are scanned onto the grid, and each scanned point functions as any other control point.

It will be appreciated that the present invention can be embodied in other specific forms without departing from the spirit or essential characteristics thereof. For example, it is not limited to the use of the thin plate spline interpolation technique. Other known interpolation techniques can be employed. Examples of such are described in the article by Terzopoulos, identified previously.

Similarly, while the animation techniques of the invention have been described with reference to their application to picture elements, they are not limited to this particular environment. Rather, they can be applied to any of a number of displayed images, such as geometric shapes, for example. In addition, the applications of the invention are not restricted to two-dimensional images. They can also be applied to three-dimensional surfaces, for example via projection methods or by means of scattered data interpolation in a volumetric grid, using three-dimensional control features.

The presently disclosed embodiments are therefore considered in all respects to be illustrative and not restrictive. The scope of the invention is indicated by the appended claims, rather than the foregoing description, and all changes which come within the meaning and range of equivalency of the claims are therefore intended to be embraced therein.

What is claimed is:

1. A method for producing an animation by generating a sequence of deformed images, comprising the steps of:
    displaying an image on a display device;
    defining discontinuities on said image;
    displacing one or more features on the displayed image in correspondence with desired deformation of the image that is to occur from one image to a subsequent image in the sequence;
    interpolating new positions for portions of the displayed image other than the displaced features to produce a deformed image;
    limiting the portions of the displayed image that undergo interpolation in correspondence with said discontinuities; and
    displaying the deformed image as a subsequent image in the sequence on said display device.

2. The method of claim 1 wherein a scattered data interpolation technique is used in said interpolating step.

3. The method of claim 2 wherein said scattered data interpolation technique employs a thin-plate spline.

4. The method of claim 1 wherein said interpolation is carried out with respect to locations on a grid, and wherein said grid is bounded by said discontinuities.

5. The method of claim 4 wherein said grid has a first resolution, and further including the step of repeating said interpolation with a second grid having a resolution that is different from said first resolution.

6. The method of claim 1 wherein at least one of said features comprises a point on the displayed image.

7. The method of claim 1 wherein at least one of said features comprises a line on the displayed image.

8. The method of claim 7 wherein said line is curved.

9. The method of claim 1, wherein said interpolating step comprises the steps of:
    (i) correlating said features to positions on a grid;
    (ii) assigning values to the grid positions, with the values for grid positions which correspond to said features being respectively related to the displacements of the features;
    (iii) determining residual values for the grid positions which do not correspond to said features;
    (iv) identifying the residual value of greatest magnitude;
    (v) relaxing the value for the grid position having the greatest magnitude, by adding its residual value to its assigned value;

(vi) updating the residual values for a predetermined number of grid positions near the grid position where said relaxation takes place;

(vii) identifying the updated residual value having the greatest magnitude; and (viii) iteratively repeating steps (v)–(vii).

10. The method of claim 9 wherein steps (v)–(vii) are repeated a predetermined number of times, and said interpolation includes the further step of iteratively repeating steps (iv)–(viii) a predetermined number of times.

11. The method of claim 10 wherein said grid has a first resolution, and further including the step of repeating said interpolation with a second grid having a resolution that is different from said first resolution.

12. A method for animating an image, comprising the steps of:

displaying one frame of an image on a display device;

defining control features on said image;

correlating said control features to positions on a grid;

defining discontinuities in said image;

determining displaced locations for at least some of said control features in a subsequent frame of animation;

interpolating said image on said grid by means of a thin-plate spline interpolation method, to produce a deformed image;

limiting the positions on said grid over which said interpolation is carried out in accordance with said discontinuities; and displaying the deformed image on said display device as a subsequent frame of the animation.

13. A method for animating an image, comprising the steps of:

displaying an image on a display device;

defining control features on said image;

correlating said control features to positions on a grid;

determining displaced locations for at least some of said control features, corresponding to desired deformation of the image;

interpolating said image, to produce a deformed image, by:

(i) assigning values to the grid positions, with the values for grid positions which correspond to said control features being respectively related to the displacements of the control features;

(ii) determining residual values for the grid positions which do not correspond to said control features;

(iii) identifying the residual value of greatest magnitude;

(iv) relaxing the value for the grid position having the greatest magnitude, by adding its residual value to its assigned value;

(v) updating the residual values for a predetermined number of grid positions near the grid position where said relaxation takes place;

(vi) identifying the updated residual value having the greatest magnitude; and (vii) iteratively repeating steps (iv)–(vi); and displaying the deformed image on said display device as a subsequent frame of the animation.

14. The method of claim 13 wherein steps (iv)–(vi) are repeated a predetermined number of times, and said interpolation includes the further step of iteratively repeating steps (iii)–(vii) a predetermined number of times.

15. The method of claim 14 wherein said grid has a first resolution, and further including the step of repeating said interpolation with a second grid having a resolution that is different from said first resolution.

16. The method of claim 13 further including the steps of defining discontinuities in said image, and limiting the positions on said grid over which said interpolation is carried out to correspond to said defined discontinuities.

17. A system for animating an image, comprising:

means for displaying successive instances of an image to to thereby provide an animation sequence;

means for identifying displacements of features of said image that are to occur during the animation sequence;

means for defining discontinuities in said image;

means for interpolating said image over a limited region of the image defined by said discontinuities to conform the image to the displaced features; and means for causing the conformed image to be displayed on said display means as a successive instance of the image in said animation sequence.

18. The system of claim 17 wherein said interpolating means employs a thin-plate spline as an interpolant.

19. The system of claim 17 wherein said interpolating means iteratively interpolates said image over a plurality of grids in succession, which have respectively different resolutions.

20. A computer-readable storage medium containing a program which executes the following steps:

displaying an image on a display device;

recording displacement of features of said image that are to occur during animation;

establishing discontinuities in said image;

interpolating said image over a limited region of the image defined by said discontinuities to conform the image to displaced features; and displaying the interpolated image on the display device.

21. The storage medium of claim 20 wherein said interpolating step is carried out by means of a scattered data interpolation technique.

22. The storage medium of claim 21 wherein said interpolating step is carried out with the use of a thin-plate spline as an interpolant.

23. The storage medium of claim 20 wherein said interpolation is carried out with respect to locations on a grid, and wherein said grid is bounded by said discontinuities.

24. The storage medium of claim 20 wherein said grid has a first resolution, and further including the step of repeating said interpolation with a second grid having a resolution that is different from said first resolution.

25. A computer readable storage medium containing a program which executes the following steps:

displaying a frame of an image on a display device;

recording control features on said image;

correlating said control features to positions on a grid;

defining discontinuities in said image;

recording displaced locations for at least some of said control features in a subsequent frame of animation;

interpolating said image on said grid by means of a thin-plate spline interpolation method, to produce a deformed image;

limiting the positions on said grid over which said interpolation is carried out in accordance with said discontinuities; and displaying the deformed image on the display device as a subsequent frame of the animation.

* * * * *